(12) United States Patent
Saroiu et al.

(10) Patent No.: US 10,978,171 B2
(45) Date of Patent: Apr. 13, 2021

(54) IDENTIFICATION OF SUSCEPTIBILITY TO INDUCED CHARGE LEAKAGE

(71) Applicant: Microsoft Technology Licensing, LLC, Redmond, WA (US)

(72) Inventors: Stefan Saroiu, Redmond, WA (US); Lucian Cojocar, Amsterdam (NL); Alastair Wolman, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/528,053

(22) Filed: Jul. 31, 2019

(65) Prior Publication Data

US 2021/0035654 A1 Feb. 4, 2021

(51) Int. Cl.
*G11C 29/50* (2006.01)
(52) U.S. Cl.
CPC .............. *G11C 29/50016* (2013.01)
(58) Field of Classification Search
CPC ............................................ G11C 29/50016
See application file for complete search history.

(56) References Cited

U.S. PATENT DOCUMENTS

| 10,108,365 B1* | 10/2018 | Bittlestone | G11C 11/408 |
| 10,169,577 B1* | 1/2019 | Sobel | G06F 21/53 |
| 10,338,818 B1* | 7/2019 | Sobel | G06F 3/0641 |
| 10,528,736 B1* | 1/2020 | Sobel | G06F 21/566 |
| 10,572,377 B1* | 2/2020 | Zhang | G11C 15/04 |
| 10,599,504 B1* | 3/2020 | BeSerra | G06F 11/0793 |
| 2003/0167428 A1 | 9/2003 | Gold | |
| 2009/0016115 A1 | 1/2009 | Morancho-Montagner et al. | |
| 2014/0059287 A1 | 2/2014 | Bains et al. | |
| 2014/0281805 A1* | 9/2014 | Sah | G11C 29/42 714/764 |
| 2017/0068607 A1* | 3/2017 | Herzi | G06F 13/24 |
| 2017/0117030 A1* | 4/2017 | Fisch | G11C 29/06 |
| 2017/0357014 A1* | 12/2017 | Kosai | G01T 1/17 |
| 2019/0198128 A1* | 6/2019 | Fan | G11C 11/4078 |
| 2019/0228815 A1* | 7/2019 | Morohashi | G11C 11/40611 |

(Continued)

OTHER PUBLICATIONS

S. Agarwal et al., "Rowhammer for Spin Torque based Memory: Problem or not?," 2018 IEEE International Magnetics Conference (INTERMAG), Singapore, 2018, pp. 1-1. (Year: 2018).*

(Continued)

*Primary Examiner* — Kyle Vallecillo

(57) ABSTRACT

Aspects of the present disclosure relate to techniques for identifying susceptibility to induced charge leakage. In examples, a susceptibility test sequence comprising a cache line flush instruction is used to repeatedly activate a row of a memory unit. The susceptibility test sequence causes induced charge leakage within rows that are physically adjacent to the activated row, such that a physical adjacency map can be generated. In other examples, a physical adjacency map is used to identify a set of adjacent rows to a target row. A susceptibility test sequence is used to repeatedly activate the set of adjacent rows, after which the content of the target row is analyzed to determine whether the any bits of the target row flipped as a result of induced charge leakage. If flipped bits are not identified, an indication is generated that the memory unit is not susceptible to induced charge leakage.

20 Claims, 11 Drawing Sheets

(56) References Cited

U.S. PATENT DOCUMENTS

2020/0012600 A1\* 1/2020 Konoth ................ G06F 21/577
2020/0174948 A1\* 6/2020 Morrison ............... G06F 12/14

OTHER PUBLICATIONS

O. Mutlu, "The RowHammer problem and other issues we may face as memory becomes denser," Design, Automation & Test in Europe Conference & Exhibition (DATE), 2017, Lausanne, 2017, pp. 1116-1121. (Year: 2017).\*
Seaborn, Mark, "Lacking Rhoticity: How physical addresses map to rows and banks in DRAM," Monday, May 4, 2015, lackingrhoticity.blogspot.com/2015/05/how-physical-addresses-map-to-rows-and-banks.html; retreived Nov. 9, 2020.
"What is the Rowhammer Dram bug and how should I treat it?" serverfault, https://serverfault.com/questions 674214/what-is-the-rowhammer-dram-bug-and-how-should-i-treat-it; retrieved Nov. 9, 2020.
Seaborn, Mark, "Project Zero: Exploiting the DRAM rowhammer bug to gain kernel privileges," https:ll googleprojectzero.blogspot.com/2015/03/exploiting-dram-rowhammer-bug-to-gain_html, retrieved Nov. 9, 2020.
Kim, et al., "Flipping Bits in Memory Without Accessing Them: An Experimental Study of DRAM Disturbance Errors", In Proceedings of ACM/IEEE 41st Annual International Symposium on Computer Architecture, Jun. 14, 2014, pp. 361-372.
"International Search Report and Written Opinion Issued in PCT Application No. PCT/US2020/036827", dated Sep. 30, 2020, 30 pages.

\* cited by examiner

IDENTIFICATION OF SUSCEPTIBILITY TO INDUCED CHARGE LEAKAGE

BACKGROUND

Maintaining the integrity of data stored in computer memory is important, not only in the context of reliability, but also for security considerations. However, in some instances, computer memory may be susceptible to induced charge leakage, which may cause a bit of the memory to "flip" or change from its original value in response to other activity in the memory. Such charge leakage may result in data loss or corruption, or may introduce potential security issues (e.g., if the bit relates to memory access permissions, is outside of an applications sandbox, etc.).

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to techniques for identifying susceptibility to induced charge leakage. In examples, a susceptibility test sequence comprising a cache line flush instruction is used to repeatedly activate a row of a memory unit. In some instances, a refresh command is suppressed or disabled, thereby preventing the memory unit from recharging its cells and increasing the likelihood of induced charge leakage. The susceptibility test sequence causes induced charge leakage within rows that are physically adjacent to the activated row. Such rows are identified and used to generate a physical adjacency map for the memory unit.

In other examples, a physical adjacency map is used to identify a set of adjacent rows to a target row. A susceptibility test sequence is used to repeatedly activate the set of adjacent rows, after which the content of the target row is analyzed to determine whether the any bits of the target row flipped as a result of induced charge leakage. If flipped bits are identified, an indication is generated that the memory unit is susceptible to induced charge leakage. However, if flipped bits are not identified, an indication is generated that the memory unit is not susceptible to induced charge leakage. As a result of using the physical adjacency map to determine adjacent rows and test the adjacent rows accordingly, the likelihood of a false negative is reduced or eliminated because the set of adjacent rows are known to be adjacent to the target row.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1A:
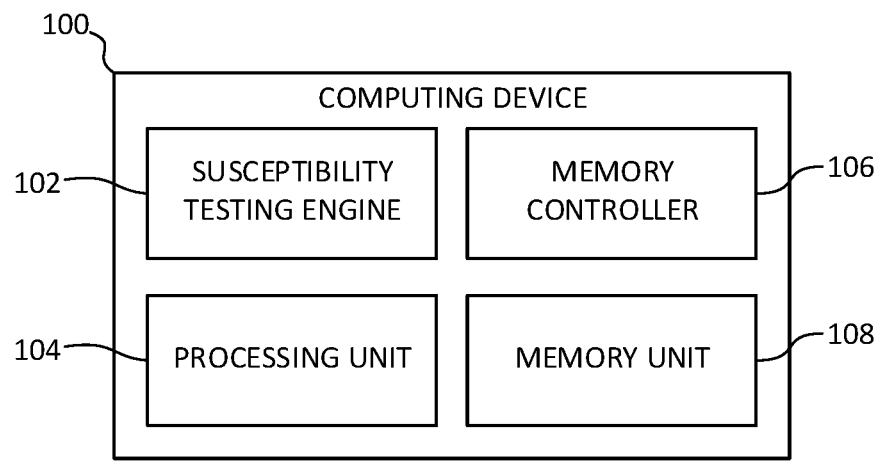
FIGS. 1A-1B illustrate overviews of example computing devices for identifying susceptibility to induced charge leakage.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In examples, memory may be susceptible to induced charge leakage. For example, dynamic random-access memory (DRAM) uses capacitors to store information, wherein each bit of information is represented by a capacitor. Capacitors are typically arranged in rows and columns. Repeatedly applying current on one row can induce current on an adjacent row, thereby affecting the charge of capacitors (and the associated bits) of the adjacent row. Accordingly, memory access patterns (e.g., resulting in row activations) in one region of memory has the potential to affect other regions. In some instances, such regions may be otherwise inaccessible to the software generating the memory access patterns (e.g., as a result of software protections, processor-level protections, etc.). Accordingly, not only does induced charge leakage result in the potential for lost or corrupted information, but it poses a security risk where software is able to avoid or potentially circumvent memory protections. Such issues are also relevant in the cloud computing context, where multiple tenants may use the same computing resources (e.g., shared storage, shared processors, shared memory, etc.).

Accordingly, aspects of the present disclosure relate to techniques for identifying the susceptibility of a memory unit to induced charge leakage. In examples, a memory unit is a dual in-line memory module (DIMM), a rank of a memory module, or a bank of a memory module, among other examples. A physical adjacency map is generated for the memory unit in order to determine how memory addresses map to the associated physical cells in the memory unit. The adjacency map is used to determine a set of memory rows in relation to a target row, which are used to test the memory unit accordingly. For example, the test comprises attempting to induce charge leakage in the target row of the memory unit using the set of memory rows. The memory unit is analyzed to determine whether any flipped bits are present, thereby determining whether the memory unit is susceptible to induced charge leakage.

Thus, aspects described herein enable the detection of memory units that may pose a threat to computer security or the exhibit the potential for data loss or data corruption, among other detriments. Further, as a result of generating a physical adjacency map for a memory unit, the likelihood of a false negative (e.g., not susceptible) is substantially reduced or eliminated. As used herein, a physical adjacency map is a data structure with which physically adjacent rows are identified even though the memory addresses for such rows may not be sequential. Without use of an adjacency map, it is difficult to determine a set of rows that are adjacent to a target row in order to properly test the memory unit. As such, if flipped bits are not identified, it may be the case that the memory unit is not susceptible to induced charge leakage. However, it may also be the case that the set of rows used to perform the test are not adjacent to the target row and therefore have little to no effect on the target row. In such instances, additional testing may be required or time-consuming techniques may be used in order to ultimately determine rows that are adjacent to the target row.

As used herein, the set of rows comprises one or more rows that are adjacent (e.g., immediately adjacent, separated by one or more intermediate rows, etc.) to the target row, wherein the target row is the row that is tested for susceptibility to induced charge leakage. It will be appreciated that the set may comprise a single row or, in other examples, the set comprises multiple rows, where at least a subpart of each row is adjacent to the target row. For example, half of a first row and half of a second row may each be adjacent to the target row. While example cell geometries of a memory unit are described herein, it will be appreciated that similar aspects are applicable to any of a variety of other geometries.

In examples, a refresh command is used to cause a memory unit to rewrite data in each cell. For example, DRAM capacitors are restored to their original charge, thereby retaining the data represented by the charged and uncharged capacitors. Accordingly, the refresh command effectively "resets" any charge leakage experienced by the memory unit, which makes it difficult to induce charge leakage to the point where a bit is flipped. Thus, in order to induce and identify flipped bits and to generate an adjacency map according to aspects described herein, it is preferable to generate a high rate of activations (e.g., between refresh commands) and, in some instances, delay or suppress refresh commands.

The susceptibility test sequence disclosed herein yields a relatively high rate of activations, which increases the likelihood of inducing charge leakage. It will be appreciated that while various example test sequences are described herein, other test sequences may be used in other examples without departing from the spirit of this disclosure. For example, certain processor architectures may not implement certain functionality described herein, or may provide a different implementation that may yield different results.

As an example, a susceptibility test sequence may comprise a set of cache line flush operations (e.g., clflush or clflushopt, as implemented by various INTEL processors) in a loop, each of which is associated with a row of memory in a memory unit. In examples, an optimized cache line flush operation is used, such as clflushopt, which enables multiple cache lines to be flushed in parallel and/or executes in fewer micro-operations as compared to other cache line flush instructions (e.g., clflush), among other examples. It will be appreciated that clflushopt is referenced herein as an example of an optimized cache line flush operation (as compared to clflush, as another example) and that a different optimized cache line flush operation may be used in other examples. Accordingly, such an instruction may cause the processor to write the cache line associated with the memory row back to the memory unit and flush the line from the processor cache. In examples, flushing the line from the cache causes a memory prefetcher to access the row and reload the data from the memory unit into the processor cache (e.g., even without a subsequent load or store instruction). Such a behavior may be performed to make efficient use of the processor cache, thereby maintaining a cache with data that is likely to be accessed (e.g., associated with the memory row). As a result of looping the sequence, a large amount of activations are generated, thereby generating a memory access pattern likely to induce charge leakage.

Further, using a susceptibility test sequence comprising cache line flush operations may reduce the impact of out-of-order execution optimizations that are typically implemented by a processor. Given the instructions of the example susceptibility test sequence above are similar, the ordering of the sequence does not substantially affect its effectiveness. As another example, a test sequence may comprise a load instruction and a cache flush instruction for each memory row. The cache flush instruction of such a sequence is used to reduce the likelihood that the processor processes a subsequent load instruction using its cache rather than by accessing the memory unit. However, if the load instruction is executed prior to completion of the cache flush instruction, the load instruction may not cause an activation to occur in the memory unit.

While the example susceptibility test sequences above may yield a relatively high activation rate, other techniques are described herein for increasing the likelihood of inducing charge leakage. For example, in addition or as an alternative to the above susceptibility test sequences, refresh commands may be suppressed, thereby causing cells of the memory unit to gradually discharge rather than being periodically refreshed. As a result, the effect of memory activations described herein is increased, such that flipped bits are more likely to manifest in the memory unit. Accordingly, one or more rows of the memory unit are repeatedly activated as described above, after which the content of the memory unit is analyzed to identify one or more affected rows. The affected rows in which flipped bits are identified are analyzed to determine their adjacency (e.g., whether they are fully adjacent, half adjacent, etc.) to other rows. In examples, such techniques are repeated with different rows in order to generate an adjacency map according to aspects described herein.

In examples, an interposer is used to suppress refresh commands. The interposer may be connected between a memory unit and a memory controller. The interposer may suppress refresh commands generated by the memory controller, such that the refresh commands are not received by the memory unit. In examples, the interposer suppresses the refresh commands in response to actuation of a physical button on the interposer or, in other examples, may receive an indication from software executing on a computing device. For example, the interposer may identify a command associated with a specific memory address, thereby indicating whether to suppress refresh commands. In some examples, the same specific memory address is used to re-enable refresh commands or, in other examples, a different memory address is used. In further examples, the interposer is connected to the computing device using a computer bus, such as a Universal Serial Bus (USB) connection through which it is controlled, among other connection techniques (e.g., any of a variety of other buses like I2C or serial, etc.).

As an example, the interposer may manipulate signals for one or more memory unit pins that are associated with a refresh command for the memory unit. Using Double Data Rate 4 (DDR4) SDRAM as an example, the command encoding for DDR4 is such that manipulating A14 to always be low in order to effectively suppress refresh commands does not affect activate, pre-charge, or write commands. Rather, changing A14 from high to low (thereby changing the refresh command to a mode register set command) has the effect of changing a read command to a write command. It will be appreciated that, in other examples, the interposer may change a signal from low to high. Even so, such a change still enables a susceptibility test sequence to be used on the memory unit. In such examples, additional pins may be manipulated. For example, bus parity check may be enabled and an $ALERT_n$ signal from the memory unit may be suppressed while the refresh command is suppressed, thereby preventing the memory unit from being retrained by the memory controller. Once the susceptibility test sequence is complete, the $ALERT_n$ signal may no longer be suppressed, such that it is received by the memory controller, thereby causing the memory controller to retrain the memory unit (e.g., returning the memory unit to a usable state).

It will be appreciated that the DDR4 SDRAM example above is provided for illustrative purposes and, in other examples, other techniques may be used to suppress refresh commands. For example, an interposer may be "active," such that it processes memory signals on the bus and relays them between the memory controller and the memory unit. Such an interposer identifies a refresh command as it is communicated from the memory controller to the memory unit, such that it may suppress the command by omitting it while still relaying other communication between the memory controller and the memory unit. As another example, the refresh rate may be disabled in software (e.g., by altering the instructions executed by the memory controller and/or the processor, etc.).

In order to generate an adjacency map, a predetermined sequence is written to the memory unit. As a result of using the predetermined sequence, the content of the memory unit may later be evaluated based on the sequence to identify flipped bits. In other examples, the content of the memory is read and stored for later comparison. Subsequently, a susceptibility test sequence is used to repeatedly activate one or more rows of the memory unit according to aspects described herein. In some examples, refresh commands are delayed or suppressed as discussed above. Once the test sequence is complete, the content of the memory is analyzed to determine the frequency and locations at which bits flipped. For example, the content may be compared to the predetermined sequence or, in other examples, may be compared to the stored content. One or more rows exhibiting a higher or highest percentage of flipped bits may be determined to be adjacent to an activated memory row, such that the adjacency map may indicate that such rows are adjacent. As an example, the adjacency map may comprise a list of memory addresses, wherein the listed addresses are physically adjacent even though the logical memory addresses may not be numerically adjacent. Such an evaluation may be iteratively performed with respect to additional rows of the memory unit, thereby forming the adjacency map.

In examples, multiple susceptibility tests are performed in parallel, thereby expediting the rate at which susceptibility testing is performed. For example, multiple ranks and/or banks of a memory unit may be tested contemporaneously. In another example, only a subset of memory rows are evaluated (e.g., a contiguous set of rows, randomly sampled rows, a set of rows that are programmatically determined based on previous observations, etc.). As another example, multiple susceptibility test sequences may be performed contemporaneously, after which the content of the memory may be evaluated with respect to each of the rows associated with the multiple test sequences. Thus, activations and content evaluation may each be batched and performed in serial, thereby reducing overhead incurred by suppressing refresh commands (and, in some instances, restoring the memory unit to a usable state).

Once an adjacency map is generated, a target row is selected. A set of adjacent rows for the target row is determined based on the adjacency map. A predetermined sequence may be loaded into the target row or, in other examples, the content of the target row is read and stored. The set of adjacent rows may then be activated using a susceptibility test sequence, after which the target row is evaluated (e.g., according to the predetermined sequence, the stored content, etc.) to determine whether flipped bits are present. In examples, the evaluation is performed without suppressing or delaying refresh commands, thereby determining whether the memory unit is susceptible to induced charge leakage under normal operating conditions. If flipped bits are not identified, an indication that the memory unit is not susceptible may be generated. By contrast, if flipped bits are identified, an indication that the memory unit is susceptible may be generated. In examples, multiple such evaluations (e.g., multiple evaluations in a given bank, multiple evaluations in a given rank, etc.) are performed before providing such an indication. In examples where multiple such evaluations are performed, the indication may comprise a failure rate (e.g., the percentage of tests that indicated the memory unit was susceptible) and/or a subpart of the memory unit that was identified to be susceptible (e.g., a bank or rank, etc.). In examples, an adjacency map for a previously observed memory unit is used, as may be the case when a memory unit is manufactured by the same manufacturer, from the same batch, or exhibits the same or similar characteristics as a previous memory unit, among other examples. Thus, adjacency map generation need not be performed prior to testing every memory unit.

Figure 1B:
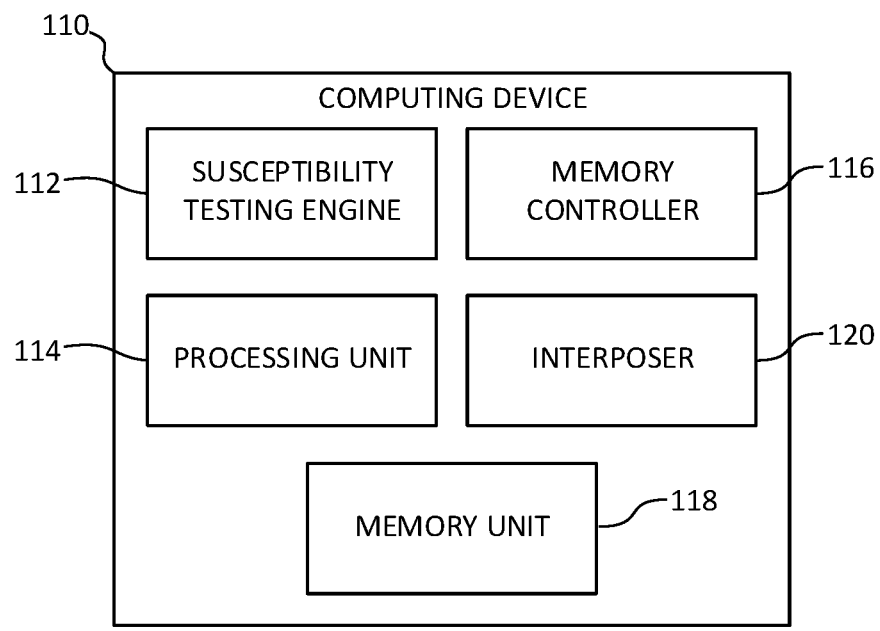

FIGS. 1A-1B illustrate example overviews of example computing devices 100 and 110 for identifying susceptibility to induced charge leakage. Turning first to FIG. 1A, computing device 100 is illustrated as comprising susceptibility testing engine 102, processing unit 104, memory controller 106, and memory unit 108. In examples, computing device 100 is a desktop computing device, a server computing device, a laptop computing device, or a mobile computing device, among other examples. In some instances, computing device 100 comprises a high-level operating system (e.g., MICROSOFT WINDOWS, LINUX, MAC OS, etc.) in which susceptibility testing engine 102. In other examples, susceptibility testing engine 102 executes on computing device 100 without such a high-level operating system (e.g., from an Extensible Firmware Interface (EFI) console), thereby removing potential abstraction layers that may be present for memory addresses. For example, one or more system virtual address tables may be used by an operating system (and, in some instances, a hypervisor). A system virtual address may translate to a system physical address, which may in turn translate to a logical address. Ultimately, the logical address may translate to an internal address used by the memory unit. Thus, in some examples, one or more such abstraction layers may be omitted.

Processing unit 104 executes instructions (e.g., susceptibility testing engine 102) and communicates with memory unit 108 via memory controller 106. In examples, memory controller 106 is part of processing unit 104. As discussed above, memory unit 108 comprises cells that store bits. As an example, memory unit 108 is a DIMM comprised of capacitors used to store bits of information. In other examples, memory unit 108 is a subpart of a memory module, such as a rank or a bank, among other examples. Memory controller 106 periodically communicates a refresh command to memory unit 108, as described above.

Susceptibility testing engine 102 generates an adjacency map and tests a memory unit for susceptibility to induced charge leakage according to aspects described herein. Susceptibility testing engine 102 may initialize memory unit 108 by loading a predetermined sequence. For example, the predetermined sequence may comprise all "1" bits, two-thirds "1" bits (e.g., 0xB6DB6DB . . . ), one-third "1" bits (e.g., 0x4924924 . . . ), or all "0" bits. In another example, susceptibility testing engine may read and store the content of memory unit 108. While example sequences are described herein, it will be appreciated that any of a variety of other sequences may be used.

In examples, processing unit 104 implements a cache line flush operation, such as clflush or clflushopt. For example, processing unit 104 may write the cache line indicated by the operation back to memory unit 108 and flush the line from the processor cache. In some instances, a memory prefetcher of processing unit 104 accesses the flushed line and reloads the data from memory unit 108 into the processor cache. Thus, as a result of looping the sequence, a large amount of activations are generated by processing unit 104, thereby causing a memory access pattern likely to induce charge leakage within memory unit 108.

Accordingly, susceptibility testing engine 102 uses a susceptibility testing sequence comprising one or more cache line flush operations, as discussed above. For example, susceptibility testing engine 102 may repeatedly activate a single memory row of memory unit 108 or, in other examples, may activate multiple memory rows (e.g., rows believed to be proximate or adjacent, rows in different banks, etc.). Susceptibility testing engine 102 may then evaluate the content of memory unit 108 to determine the location and frequency of flipped bits. In examples, the evaluation comprises comparing the content of memory unit 108 to the predetermined sequence or the previously stored content. The location and frequency of flipped bits is then compared to the one or more rows with which the susceptibility testing sequence was performed in order to generate the physical adjacency map.

Susceptibility testing engine 102 may use an adjacency map in order to evaluate a target row. In examples, the adjacency map is generated based on an evaluation of memory unit 108. In other examples, characteristics of memory unit 108 are evaluated to determine a pre-existing adjacency map. Example characteristics include, but are not limited to, manufacturer, serial number, batch number, capacity, operating frequency, number of banks, and/or date of manufacture, among other examples. The adjacency map is used to determine a set of adjacent rows with respect to the target row. Susceptibility testing engine 102 may load a sequence of predetermined bits into the target row or may read and store the content of the target row. Susceptibility testing engine 102 may perform a susceptibility testing sequence with respect to each adjacent row, after which susceptibility testing engine 102 evaluates the target row (e.g., compared to the predetermined sequence, stored content, etc.) to determine whether any flipped bits are present. If flipped bits are not identified, susceptibility testing engine 102 generates an indication that the memory unit is not susceptible. By contrast, if flipped bits are identified, susceptibility testing engine 102 generates an indication that the memory unit is susceptible. It will be appreciated that this is a simplified example of the aspects described herein. In other examples and as discussed above, multiple such evaluations are performed (e.g., multiple rows in the same bank, multiple banks of the same memory unit, etc.).

Turning now to FIG. 1B, computing device 110 is illustrated as comprising susceptibility engine 112, processing unit 114, memory controller 116, and memory unit 118. Such aspects are similar to those discussed above with respect to FIG. 1A and therefore are not necessarily re-described below in detail. Computing device 110 further comprises interposer 120. In examples, interposer 120 is communicatively connected between memory unit 118 and memory controller 116. As discussed above, interposer 120 is used to suppress refresh commands generated by memory controller 116, such that memory unit 118 does not refresh its cells, thereby increasing the effectiveness of a susceptibility test sequence. In examples, interposer 120 further suppresses an $ALERT_n$ signal from memory unit 118. It will be appreciated that interposer 120 may suppress or manipulate any of a variety of other signals in addition to a refresh command. In examples, interposer 120 comprises a physical button to toggle refresh command suppression. In other examples, interposer 120 identifies a specific command or memory address (among other indications) in order to determine whether to suppress or permit refresh commands. For example, susceptibility testing engine 112 may generate an indication to interposer 120 that refresh commands should be suppressed, after which it may execute a susceptibility test sequence and subsequently generate an indication to interposer 120 that normal operation should resume.

Figure 2:
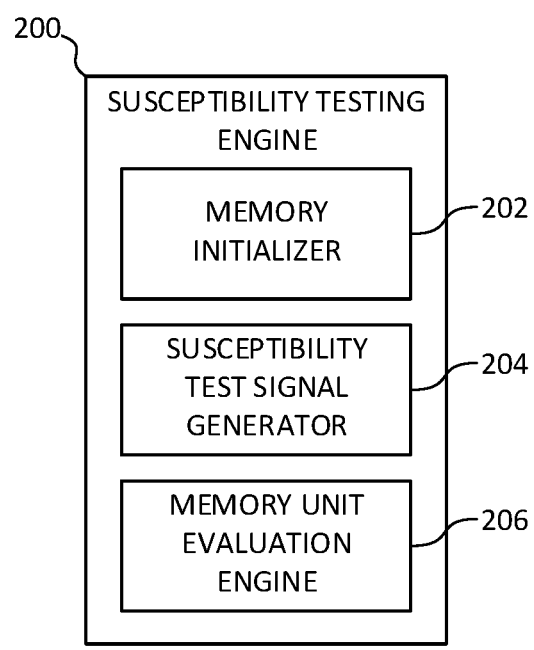
FIG. 2 illustrates an overview of an example susceptibility testing engine according to aspects described herein.

FIG. 2 illustrates an overview of an example susceptibility testing engine 200 according to aspects described herein. In examples, susceptibility testing engine 200 is similar to susceptibility testing engine 102 or 112 in FIGS. 1A and 1B discussed above. Susceptibility testing engine 200 is illustrated as comprising memory initializer 202, susceptibility test signal generator 204, and memory unit evaluation engine 206.

Memory initializer 202 initializes a memory unit for susceptibility testing. In examples, memory initializer 202 loads a predetermined sequence of bits into the memory unit. Example sequences include, but are not limited to, all "1" bits, a repeating varied ratio of "1" and "0" bits (e.g., two-thirds, one-third, etc.), or all "0" bits. In other examples, memory initializer 202 reads and stores at least a part of the content of the memory unit. In some examples, the stored content is compressed. As another example, memory initializer 202 generates an indication to an interposer (e.g., interposer 120 in FIG. 1B) to suppress refresh commands (and one or more other commands, such as $ALERT_n$, in some examples). In another example, memory initializer 202 further enables a parity check associated with the memory unit.

Susceptibility testing engine 200 further comprises susceptibility test signal generator 204, which executes a susceptibility test sequence according to aspects described herein. In examples, susceptibility test signal generator iteratively executes a susceptibility test sequence with respect to different rows of a memory unit. For example, susceptibility test signal generator 204 may select sequential rows to test or may determine subsequent rows according to results from previously evaluated rows, among other examples. As described above, susceptibility test signal generator 204 may use one or more cache line flush instructions, such as clflush or clflushopt, thereby causing a processing unit (e.g., processing unit 104 or 114 in FIG. 1A or 1B, respectively) to prefetch a line from the memory unit (e.g., as may be associated with the line specified by the cache line flush instruction). Thus, susceptibility test signal generator repeatedly activates one or more rows of a memory unit in order to induce charge leakage.

Once susceptibility test signal generator 204 completes the susceptibility test sequence, memory unit evaluation engine 206 evaluates the content of the memory unit. In examples, the content is compared to a predetermined sequence or previously stored content (e.g., as may have been loaded or stored by memory initializer 202). Memory unit evaluation engine 206 identifies the location and frequency of flipped bits as compared to the rows tested by susceptibility test signal generator 204. Accordingly, memory unit evaluation engine 206 generates a physical adjacency map. For example, one or more rows having the highest percentage of flipped bits may be determined to be immediately next to a tested row. In another example, a row having the second highest percentage of flipped bits may be determined to be indirectly adjacent to the tested row, separated by an intermediate row (e.g., the row having the highest percentage of flipped bits). Thus, the one or more rows may be ranked according to the incidence of flipped bits in order to generate the adjacency map. In some examples, a row of memory addresses may be split across multiple rows (e.g., half-row adjacency, third-row adjacency, etc.), wherein multiple tested rows exhibit a smaller proportion of flipped bits. For example, only about half of the cells of a half-adjacent row may be adjacent to the test row and therefore may exhibit flipped bits. The other half are not adjacent and therefore may exhibit fewer or no flipped bits, such that the maximum percentage of flipped bits for such a row would be approximately half of the cells.

In other examples, susceptibility test signal generator 204 uses a physical adjacency map (e.g., as may be generated by memory evaluation engine 206) to evaluate a target row. Memory initializer 202 may load a predetermined set of bits into the target row or may store the contents for later evaluation, as described above. Susceptibility test signal generator 204 may determine a set of adjacent rows to the target row, and may execute a susceptibility test sequence with respect to the determined set of rows. Memory unit evaluation engine 206 may then evaluate the target row to determine whether any bits of the target row flipped. It will be appreciated that such an evaluation may be performed multiple times (e.g., on the same target row, with respect to other rows in the same bank, rows in one or more other banks, etc.).

Figure 3A:
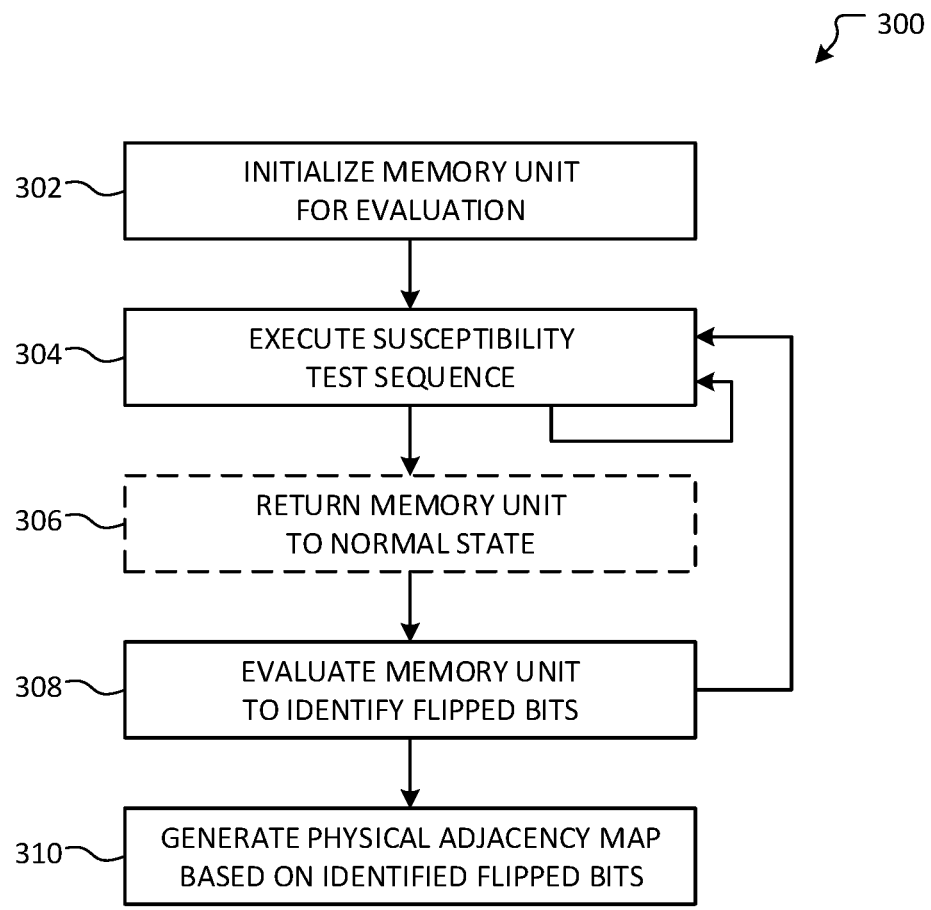
FIG. 3A illustrates an overview of an example method for generating an adjacency map for memory addresses of a memory unit.

FIG. 3A illustrates an overview of an example method 300 for generating an adjacency map for memory addresses of a memory unit. In examples, aspects of method 300 are performed by a susceptibility testing engine, such as susceptibility testing engine 102, 112, or 200 in FIG. 1A, 1B, or 2, respectively. Method 300 begins at operation 302, where a memory unit is initialized for evaluation. In examples, aspects of operation 302 are performed by a memory initializer, such as memory initializer 202 in FIG. 2. As an example, a predetermined sequence of bits is loaded into the memory unit. In other examples, at least a part of the content of the memory unit is read and stored. In some examples the content may be compressed prior to storage. As another example, an indication may be provided to an interposer (e.g., interposer 120 in FIG. 1B) to suppress refresh commands (and one or more other commands, such as $ALERT_n$, in some examples). In another example, a parity check associated with the memory unit may be enabled.

At operation 304, a susceptibility test sequence is executed. In examples, aspects of operation 304 are performed by a susceptibility test signal generator, such as susceptibility test signal generator 204 in FIG. 2. As described above, the susceptibility test sequence may comprise one or more cache line flush instructions associated with a set of memory row, including, but not limited to, clflush or clflushopt. In some examples, the susceptibility test sequence may further comprise one or more load memory instructions in addition to the cache line flush instructions. For example, a set of clflushopt instructions may be used in a loop, thereby causing the processor to write the cache line back to the memory unit and flush the line from the processor cache. As a result, the memory prefetcher to accesses the line and reloads the data from the memory unit into the processor cache. Operation 304 is depicted with an arrow to itself to indicate that the susceptibility test sequence is repeatedly executed or otherwise executed in a loop, thereby repeatedly activating one or more rows of memory.

Flow progresses to operation 306, where the memory unit is returned to a usable state. Operation 306 is illustrated using a dashed box to indicate that operation 306 is only performed in some examples. For example, if an interposer (e.g., interposer 120 in FIG. 1B) is used and $ALERT_n$ signals are suppressed, an indication is generated to instruct the interposer to permit $ALERT_n$ instructions to flow between the memory unit and the memory controller, thereby causing the memory controller to retrain the memory unit and return the memory unit to a normal state. As another example, an indication is generated to the interposer to permit refresh commands to be received by the memory unit. It will be appreciated that any of a variety of other operations may be performed to return the memory unit to a normal state.

Flow progresses to operation 308, where the memory unit is evaluated to identify flipped bits. Aspects of operation 308 may be performed by a memory unit evaluation engine, such as memory unit evaluation engine 206 in FIG. 2. In examples, content of the memory unit is compared to a predetermined sequence or previously stored content (e.g., as may have been loaded or stored at operation 302). The evaluation may comprise determining the location and/or frequency of flipped bits in the memory unit. As an example, the location may be compared to one or more rows tested by the susceptibility test sequence, as was executed at operation 304. Method 300 is illustrated as comprising an arrow from operation 308 to operation 304 to illustrated that susceptibility testing may be repeatedly performed. For example, the same memory row may be evaluated multiple times and/or different memory rows may be evaluated, among other examples. Thus, flow may loop between operations 304 and 308.

Eventually, flow arrives at operation 310, where a physical adjacency map is generated based on the flipped bits identified at operation 308. In examples, aspects of operation 310 are performed by a memory unit evaluation engine, such as memory unit evaluation engine 206 in FIG. 2. As an example, one or more rows identified as having the highest percentage of flipped bits in relation to a tested row may be determined to be immediately next to the tested row. In another example, a row having the second highest percentage of flipped bits may be determined to be indirectly adjacent to the tested row, separated by an intermediate row (e.g., the row in the preceding example having the highest percentage of flipped bits). Thus, the one or more rows may be ranked according to the incidence of flipped bits. The ranked list may be processed according to a threshold (e.g., at or above a certain percentage, at or above a position in the ranked list, etc.), where one or more rows above the threshold are determined to be adjacent to the memory row. As discussed above, a row of memory addresses may be split across multiple rows, wherein multiple tested rows exhibit a smaller proportion of flipped bits than was observed with full-row adjacency. Flow terminates at operation 310.

While the operations of method 300 is described above in a certain order, it will be appreciated that any of a variety of other orders may be utilized. For example, multiple memory rows may be processed at operation 304 before proceeding to operations 306 and 308, such that the evaluation at operation 308 is performed with respect to each of the memory rows that were tested at operation 304. As another example, method 300 may be performed to test memory rows of multiple banks contemporaneously, as discussed above in greater detail.

Figure 3B:
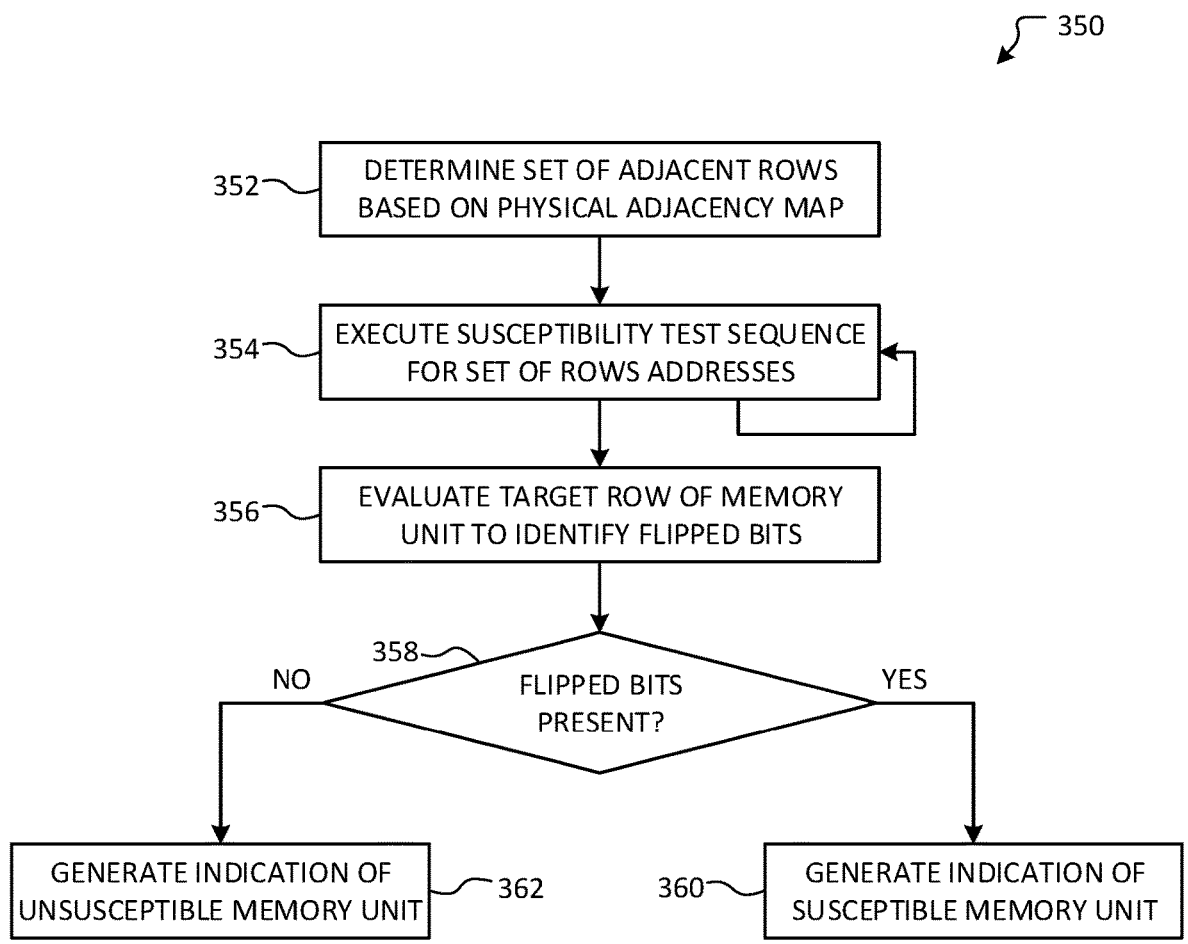
FIG. 3B illustrates an overview of an example method for evaluating a memory unit according to an adjacency map to determine susceptibility to induced charge leakage.

FIG. 3B illustrates an overview of an example method 350 for evaluating a memory unit according to an adjacency map to determine the susceptibility of a memory unit to induced charge leakage. In examples, aspects of method 350 are performed by a susceptibility testing engine, such as susceptibility testing engine 102, 112, or 200 in FIG. 1A, 1B, or 2, respectively. Method 350 begins at operation 352, where a set of adjacent rows for a target row are determined based on a physical adjacency map. In examples, the physical adjacency map was generated according to aspects of method 300 discussed above with respect to FIG. 3A. In some examples, the physical adjacency map was generated based on the memory unit undergoing testing while, in other examples, the adjacency map was generated from a different memory unit and was selected according to an evaluation of characteristics associated with the memory unit. The set of adjacent rows may comprise a single row or, in other examples, may comprise multiple rows where at least a subpart of each row is adjacent to the target row. For example, half of a first row and half of a second row may each be adjacent to the target row.

Flow progresses to operation 354, where a susceptibility test sequence is executed for the set of adjacent rows. In examples, aspects of operation 354 are performed by a susceptibility test signal generator, such as susceptibility test signal generator 204 in FIG. 2. In some examples, the target row is initialized with a sequence of predetermined bits or the content of the target row is read and stored, as may be performed by a memory initializer (e.g., memory initializer 202 in FIG. 2). As described herein, the susceptibility test sequence may comprise one or more cache line flush instructions for each adjacent row. In some examples, the susceptibility test sequence may further comprise one or more load memory instructions in addition to the cache line flush instructions. Operation 354 is depicted with an arrow to itself to indicate that the susceptibility test sequence is repeatedly executed or otherwise executed in a loop, thereby repeatedly activating each of the adjacent rows in the memory unit.

Flow progresses to determination 356, where it is determined whether flipped bits are present in the target row. Aspects of determination 356 may be performed by a memory unit evaluation engine, such as memory unit evaluation engine 206 in FIG. 2. In examples, the target row of the memory unit is compared to a predetermined sequence or previously stored content (e.g., as may have been loaded into the target row or stored at operation 354).

If it is determined that flipped bits are present, flow branches "YES" to operation 360, where an indication that the memory unit is susceptible is generated. In some examples, the indication comprises an indication as to a memory bank of the memory unit or a number or percentage of bits that were determined to have flipped. Flow terminates at operation 360.

If, however, it is determined that flipped bits are not present, flow instead branches "NO" to operation 362, where an indication is generated that the memory unit is not susceptible. In examples, the indication comprises a number or percentage of bits that were checked and/or the number of times the test was performed, among other information. Flow terminates at operation 362.

It will be appreciated that the above discussion of method 350 provides a simplified example of the aspects described herein. In other examples and as discussed above, multiple such susceptibility evaluations are performed (e.g., the same row multiple times, multiple rows in the same bank, multiple banks of the same memory unit, etc.). Additionally, multiple target rows may be tested contemporaneously.

Figure 4A:
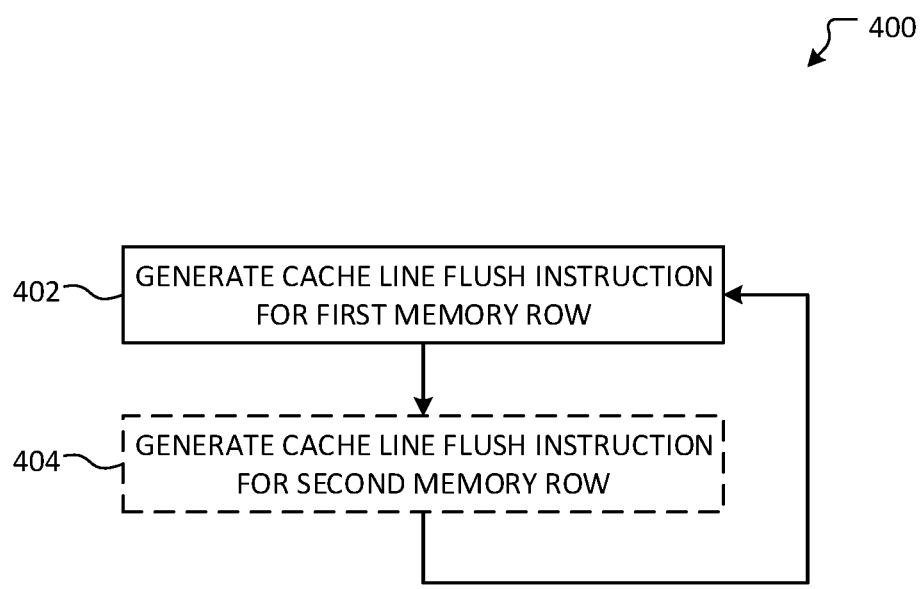
FIG. 4A illustrates an overview of an example method for generating a susceptibility test signal.

FIG. 4A illustrates an overview of an example method 400 for generating a susceptibility test signal. In examples, aspects of method 400 are performed by a susceptibility test signal generator, such as susceptibility test signal generator 204 in FIG. 2. In other examples, aspects of method 400 may be performed at operation 304 or operation 354 in FIG. 3A or 3B, respectively. It will be appreciated that method 400 is provided as an example and that, in other examples, other test sequences may be used without departing from the spirit of this disclosure. For example, certain processor architectures may not implement certain functionality described herein, or may provide a different implementation of the instructions discussed below, which may yield different results.

Method 400 begins at operation 402, where a cache line flush instruction is generated for a first memory row. In examples, the memory row is a memory row used to generate a physical adjacency map, as discussed above with respect to operation 304 in FIG. 3A. In another example, the memory row is an adjacent row to a target memory row, as discussed above with respect to operation 354 in FIG. 3B. As an example, the cache line flush instruction may be a clflush or clflushopt instruction, as is implemented by various INTEL processors. Accordingly, a processing unit (e.g., processing unit 104 or 114 in FIG. 1A or 1B, respectively) may write the cache line associated with the memory row back to the memory unit and flush the line from the processor cache. In response, a memory prefetcher accesses the line from the memory unit and reloads the data into the processor cache.

In examples, flow progresses to operation 404, where a cache line flush instruction is generated for a second memory row. Operation 404 is illustrated using a dash box to indicate that, in other examples, operation 404 is omitted. Rather, flow loops at operation 402, thereby generating a high rate of memory activations for the first memory row. Operation 404 may be performed in examples where another adjacent row to a target row is used. In other examples, the second memory address is in a different memory bank. Similar to operation 402, a clflush or clflushopt instruction may be used that indicates the second memory row. Flow is illustrated as looping between operations 402 and 404 in order to generate a high rate of memory activations for both the first and second memory rows. Flow eventually terminates, after which the memory content is evaluated according to aspects described herein.

Figure 4B:
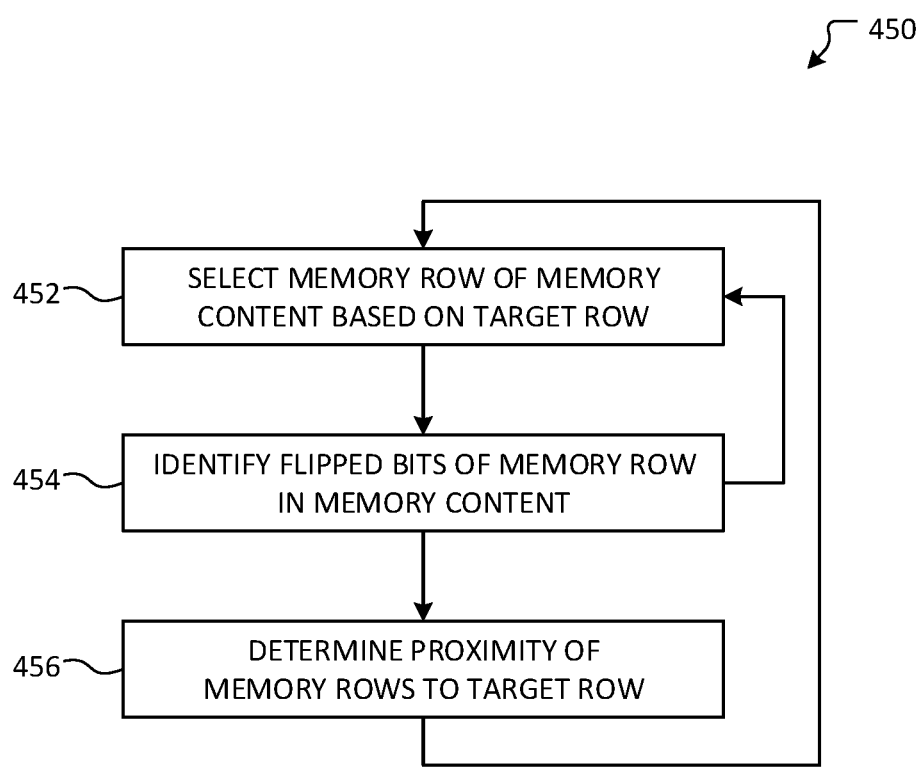
FIG. 4B illustrates an overview of an example method for generating an adjacency map from content of a memory unit.

FIG. 4B illustrates an overview of an example method 450 for generating an adjacency map from content of a memory unit. In examples, aspects of method 450 are performed by a memory unit evaluation engine, such as memory unit evaluation engine 206 in FIG. 2. Memory content evaluated by method 450 may have been generated based on performing at least a part of method 300 in FIG. 3A and/or method 400 in FIG. 4A. In examples, aspects of method 450 may be performed at operations 308 and/or 310 of method 300 discussed above with respect to FIG. 3A. Thus, at least a part of the memory content may have been affected by performing a susceptibility test sequence with respect to one or more memory rows according to aspects described herein.

Method 450 begins at operation 452, where a set of memory rows of the memory content is selected based on the target row. In examples, one or more memory rows are selected according to proximity to the target row. For example, memory rows immediately adjacent to the target row may be selected for evaluation. In other examples, the analysis may evaluate memory rows that are increasingly distant from the target row. As an example, first rows that are immediately adjacent (e.g., plus or minus one row), then rows that are adjacent but separated by the first rows (e.g., plus or minus two rows), etc. As another example, a memory row may be selected according to one or more adjacency maps generated from previously analyzed memory units. In such instances, it may be determined that, for a given target row, one or more predicted rows should be evaluated. The predicted rows may be determined based on which rows have been commonly observed to be adjacent to the target row for the previous memory units. Such an analysis may be performed based on adjacency maps for the same vendor, same memory capacity, etc. While example techniques for determining one or more memory rows for evaluation are described herein, it will be appreciated that any of a variety of other techniques may be used.

Flow progresses to operation 454, where flipped bits are identified in the determined set of memory rows. In examples, the memory content associated with the set of memory rows is evaluated according to a predetermined pattern or previously stored content for the memory rows, as described above. Method 450 is illustrated with an arrow from operation 454 to operation 452 to indicate that operations 452 and 454 may be performed multiple times, each with respect to different memory rows for the memory content. For example, a frequency of flipped bits may be determined for rows on either side of the target row up to a given threshold. As an example, the threshold may be determined based on the number of rows in a memory bank or an average number of rows expected or previously observed to exhibit the effects of induced charge leakage. In other examples, flow loops between operations 452 and 454 until flipped bits are no longer identified.

Moving to operation 456, the proximity of the selected memory rows to the target row is determined. In examples, one or more rows identified as having the highest percentage of flipped bits in relation to the target row may be determined to be immediately next to the tested row. If there are multiple such rows (e.g., a row on either side of the target row), the order of the rows may be determined based observations for other memory rows. For example, a memory row two rows greater than the target memory row may be observed, such that the memory row between the other memory row and the target memory row is determined to be the row that is one row greater than the target row. In another example, a row having the second highest percentage of flipped bits may be determined to be indirectly adjacent to the tested row, separated by an intermediate row (e.g., the row in the preceding example having the highest percentage of flipped bits). As discussed above, a row of memory addresses may be split across multiple rows, wherein multiple tested rows exhibit a smaller proportion of flipped bits than was observed with full-row adjacency. Flow terminates at operation 456.

FIGS. 5-8 and the associated descriptions provide a discussion of a variety of operating environments in which aspects of the disclosure may be practiced. However, the devices and systems illustrated and discussed with respect to FIGS. 5-8 are for purposes of example and illustration and are not limiting of a vast number of computing device configurations that may be utilized for practicing aspects of the disclosure, described herein.

Figure 5:
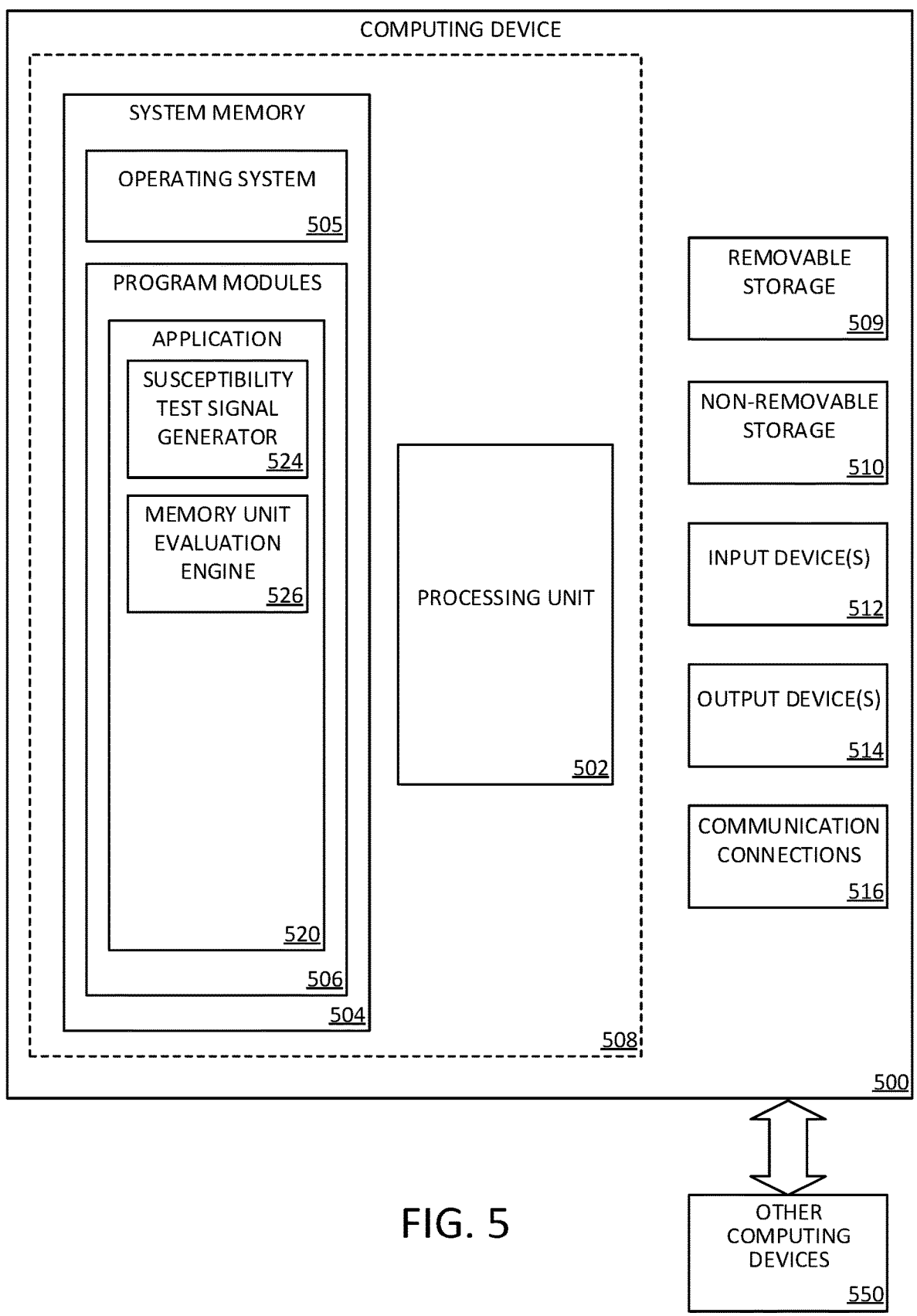
FIG. 5 is a block diagram illustrating example physical components of a computing device with which aspects of the disclosure may be practiced.

FIG. 5 is a block diagram illustrating physical components (e.g., hardware) of a computing device 500 with which aspects of the disclosure may be practiced. The computing device components described below may be suitable for the computing devices described above, including the computing devices 100 and 110 in FIGS. 1A and 1B. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories.

The system memory 504 may include an operating system 505 and one or more program modules 506 suitable for running software application 520, such as one or more components supported by the systems described herein. As examples, system memory 504 may store susceptibility test signal generator 524 and memory unit evaluation engine 526. The operating system 505, for example, may be suitable for controlling the operation of the computing device 500.

Furthermore, embodiments of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 (e.g., application 520) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 500 may also have one or more input device(s) 512 such as a keyboard, a mouse, a pen, a sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
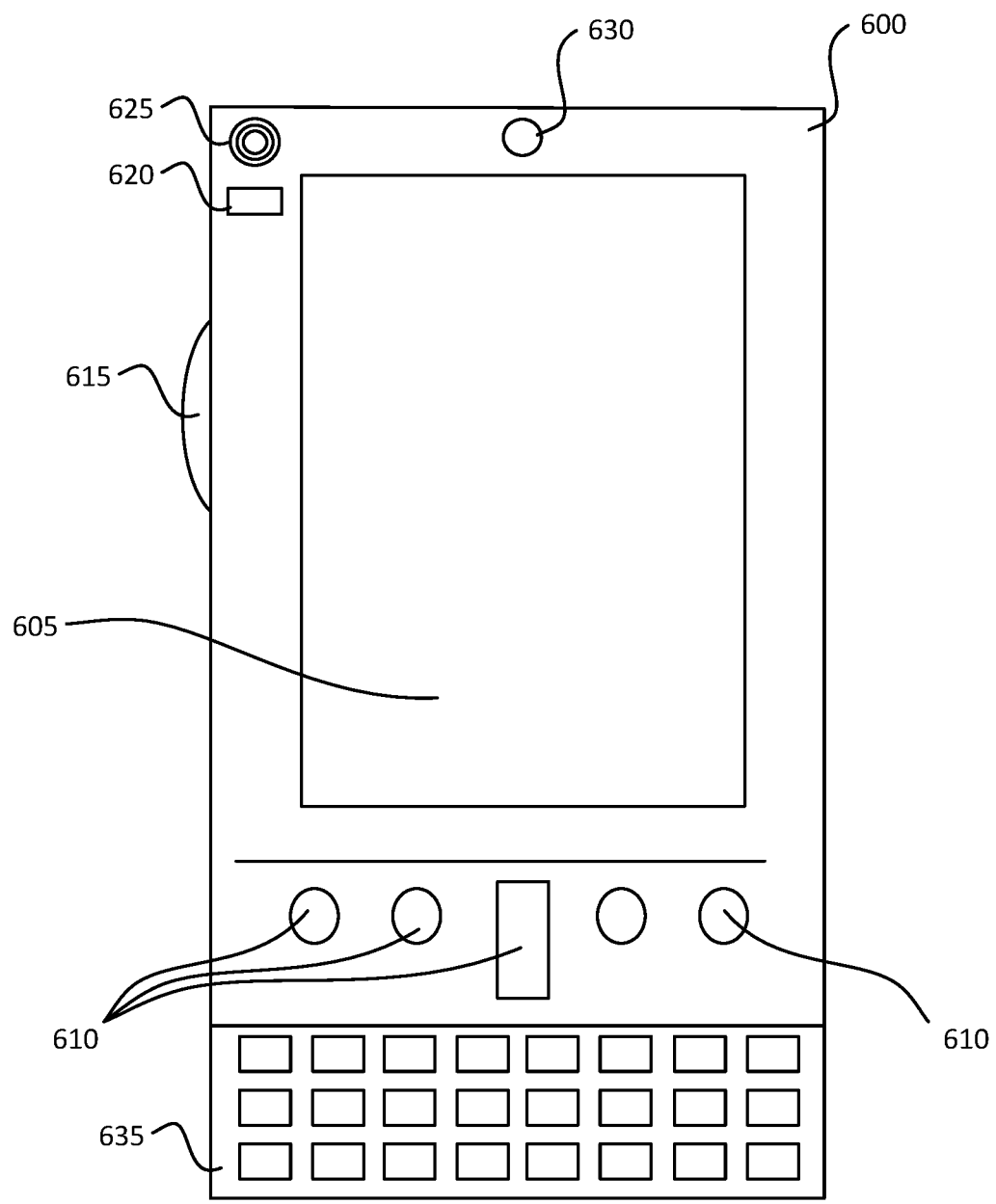
FIGS. 6A and 6B are simplified block diagrams of a mobile computing device with which aspects of the present disclosure may be practiced.
Figure 6B:
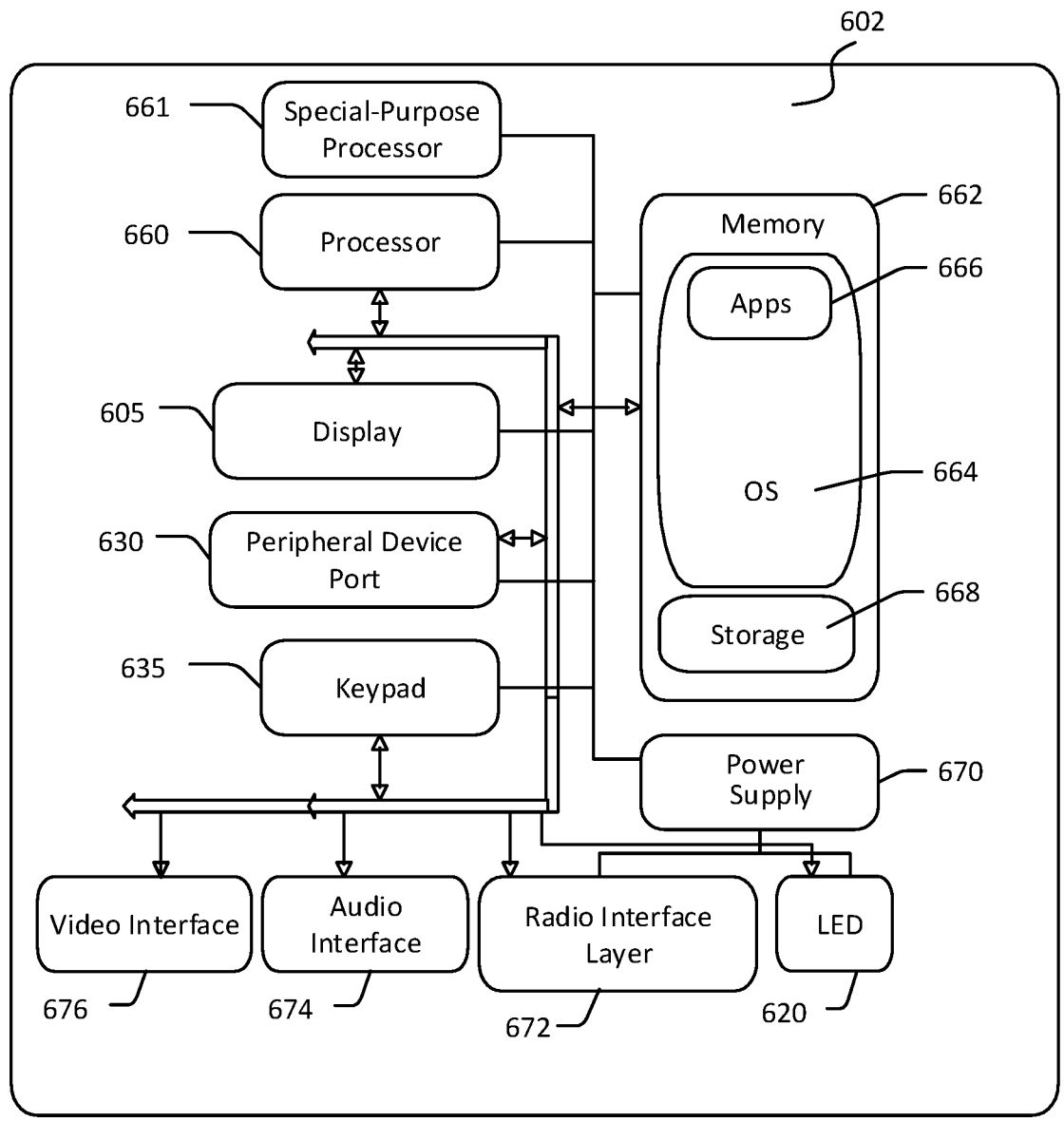

FIGS. 6A and 6B illustrate a mobile computing device 600, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 6A, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display).

If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some embodiments.

In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display.

In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one aspect of a mobile computing device. That is, the mobile computing device 600 can incorporate a system (e.g., an architecture) 602 to implement some aspects. In one embodiment, the system 602 is implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600 described herein (e.g., search engine, extractor module, relevancy ranking module, answer scoring module, etc.).

The system 602 has a power supply 670, which may be implemented as one or more batteries. The power supply 670 might further include an external power source, such as an AC adapter or a powered docking cradle that supplements or recharges the batteries.

The system 602 may also include a radio interface layer 672 that performs the function of transmitting and receiving radio frequency communications. The radio interface layer 672 facilitates wireless connectivity between the system 602 and the "outside world," via a communications carrier or service provider. Transmissions to and from the radio interface layer 672 are conducted under control of the operating system 664. In other words, communications received by the radio interface layer 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated embodiment, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with embodiments of the present disclosure, the microphone may also serve as an audio sensor to facilitate control of notifications, as will be described below. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio interface layer 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio interface layer 672 or via a distributed computing network. Similarly, such data/information may be readily transferred between computing devices for storage and use according to well-known data/information transfer and storage means, including electronic mail and collaborative data/information sharing systems.

Figure 7:
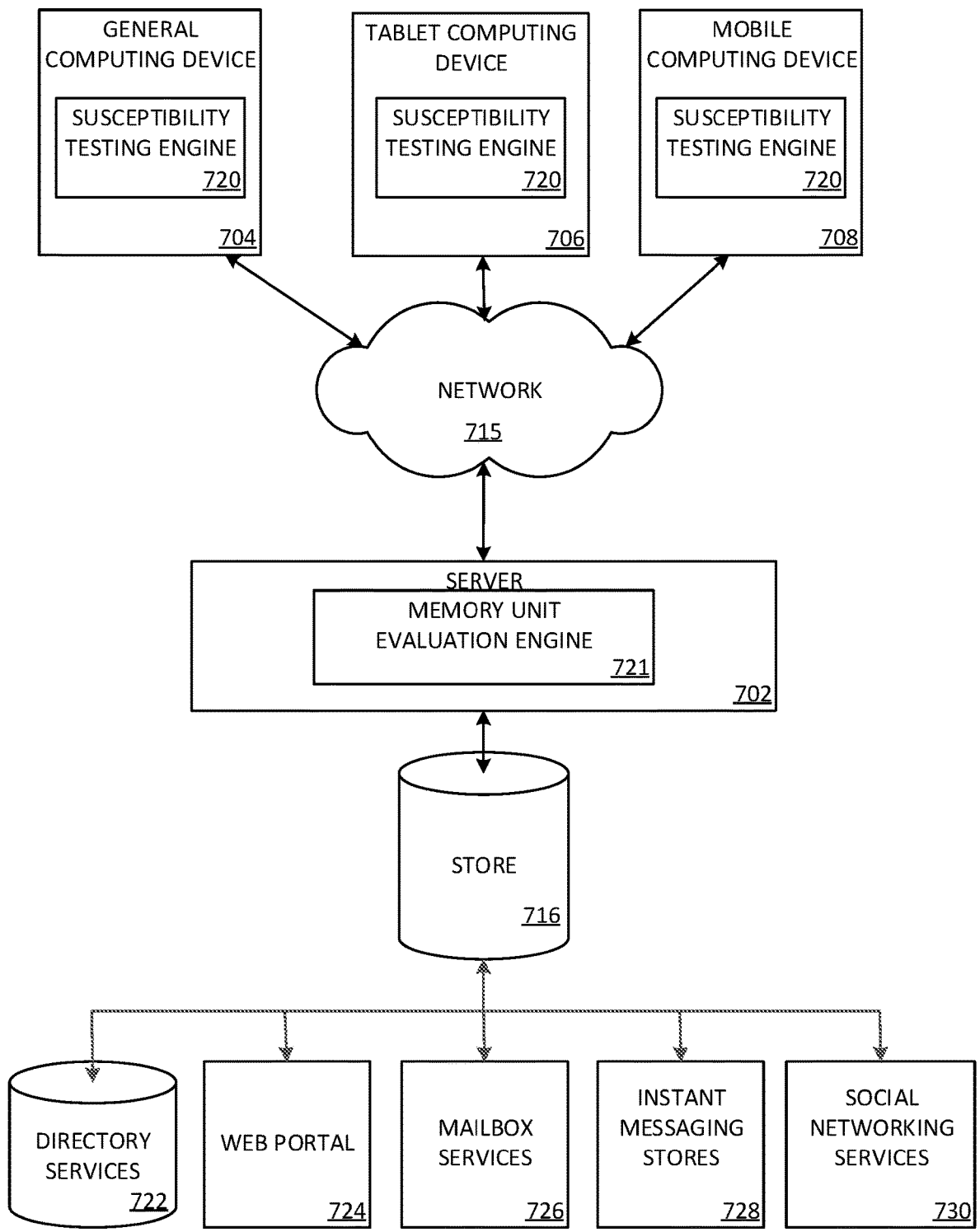
FIG. 7 is a simplified block diagram of a distributed computing system in which aspects of the present disclosure may be practiced.

FIG. 7 illustrates one aspect of the architecture of a system for processing data received at a computing system from a remote source, such as a personal computer 704, tablet computing device 706, or mobile computing device 708, as described above. Content displayed at server device 702 may be stored in different communication channels or other storage types. For example, various documents may be stored using a directory service 722, a web portal 724, a mailbox service 726, an instant messaging store 728, or a social networking site 730.

A susceptibility testing engine 720 may be employed by a client that communicates with server device 702, and/or the memory unit evaluation engine 721 may be employed by server device 702. Thus, it will be appreciated that memory unit evaluation need not occur on the computing device at which the susceptibility test sequence is executed. Rather, at least a subpart of the memory content associated with the evaluation techniques described herein may be communicated to server 702 for processing by memory unit evaluation engine 721. The server device 702 may provide data to and from a client computing device such as a personal computer 704, a tablet computing device 706 and/or a mobile computing device 708 (e.g., a smart phone) through a network 715. By way of example, the computer system described above may be embodied in a personal computer 704, a tablet computing device 706 and/or a mobile computing device 708 (e.g., a smart phone). Any of these embodiments of the computing devices may obtain content from the store 716, in addition to receiving graphical data useable to be either pre-processed at a graphic-originating system, or post-processed at a receiving computing system.

Figure 8:
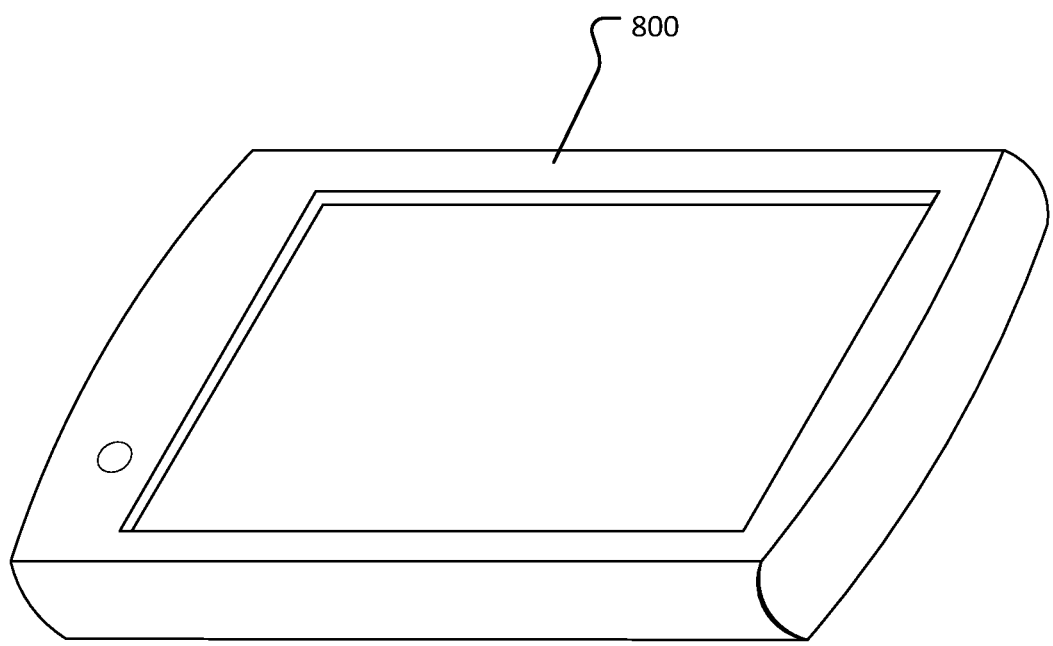
FIG. 8 illustrates a tablet computing device for executing one or more aspects of the present disclosure.

FIG. 8 illustrates an exemplary tablet computing device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As will be understood from the foregoing disclosure, one aspect of the technology relates to a system comprising: at least one processor; and memory storing instructions that, when executed by the at least one processor, causes the system to perform a set of operations. The set of operations comprises: accessing, for a memory unit, a physical adjacency map; determining, based on the physical adjacency map, a first set of adjacent memory rows for a first target row of the memory unit; activating, using a susceptibility test sequence, each memory row of the first set of adjacent memory rows; evaluating the first target row to determine if one or more bits of the first target row changed; and based on determining that one or more bits of the first target row did not change, generating an indication that the memory unit is not susceptible to induced charge leakage. In an example, susceptibility test sequence comprises a cache line flush instruction for each memory row of the first set of adjacent memory rows. In another example, the cache line flush instruction for each memory row causes the processor to prefetch data from the memory unit, thereby generating an activation for the memory row. In a further example, the susceptibility test sequence further comprises at least one of a load instruction or a store instruction for each memory row of the first set of adjacent memory rows. In yet another example, the set of operations further comprises loading a predetermined sequence of bits into the first target row, and evaluating the first target row to determine if one or more bits of the first target row changed comprises evaluating the first target row based on the predetermined sequence of bits. In a further still example, the set of operations further comprises: determining, based on the physical adjacency map, a second set of adjacent memory rows for a second target row of the memory unit, wherein the second target row of the memory unit is in a different bank of the memory unit than the first target row; activating, using the susceptibility test sequence, each memory row of the second set of adjacent memory rows; and evaluating the second target row to determine if one or more bits of the second target row changed. In another example, the indication that the memory unit is not susceptible to induced charge leakage is generated further based on determining that one or more bits of the second target row did not change.

In another aspect, the technology relates to a method for generating a physical adjacency map. The method comprises: initializing content of a memory unit; activating, using a susceptibility test sequence, a first memory row of the memory unit; evaluating the memory unit based on the content to identify one or more rows of the memory unit where bits changed; and generating, based on an evaluation of the one or more rows and the first memory row, a physical adjacency map indicating at least one row of the one or more rows is adjacent to the first memory row. In an example, the method further comprises: determining, based on the physical adjacency map, a set of adjacent memory rows for a target row of the memory unit; activating, using the susceptibility test sequence, each memory row of the set of adjacent memory rows; evaluating the target row to determine if one or more bits of the target row changed; and based on determining that one or more bits of the target row did not change, generating an indication that the memory unit is not susceptible to induced charge leakage. In another example, the susceptibility test sequence is a sequence selected from the group of sequences consisting of: an optimized cache line flush instruction for the first memory row that causes the first memory row to be prefeteched, thereby generating an activation for the first memory row; a load instruction for the first memory row and a cache line flush instruction for the first memory row; and a store instruction for the first memory row and a cache line flush instruction for the first memory row. In a further example, initializing content of the memory unit comprises one of: loading a sequence of predetermined bits into at least part of the memory unit; or storing at least a part of the memory unit content. In yet another example, initializing content of the memory unit comprises: generating an indication to an interposer to suppress refresh commands to the memory unit. In a further still example, the method further comprises: after activating the first memory row, generating an indication to the interposer to permit refresh commands to the memory unit.

In a further aspect, the technology relates to a method for identifying susceptibility of induced charge leakage for a memory unit. The method comprises: accessing, for a memory unit, a physical adjacency map; determining, based on the physical adjacency map, a first set of adjacent memory rows for a first target row of the memory unit; activating, using a susceptibility test sequence, each memory row of the first set of adjacent memory rows; evaluating the first target row to determine if one or more bits of the first target row changed; and based on determining that one or more bits of the first target row did not change, generating an indication that the memory unit is not susceptible to induced charge leakage. In an example, the susceptibility test sequence comprises a cache line flush instruction for each memory row of the first set of adjacent memory rows. In another example, the cache line flush instruction is an optimized cache line flush instruction. In a further example, the susceptibility test sequence further comprises at least one of a load instruction or a store instruction for each memory row of the first set of adjacent memory rows. In yet another example, the method further comprises loading a predetermined sequence of bits into the first target row, and evaluating the first target row to determine if one or more bits of the first target row changed comprises evaluating the first target row based on the predetermined sequence of bits. In a further still example, the method further comprises: determining, based on the physical adjacency map, a second set of adjacent memory rows for a second target row of the memory unit, wherein the second target row of the memory unit is in a different bank of the memory unit than the first target row; activating, using the susceptibility test sequence, each memory row of the second set of adjacent memory rows; and evaluating the second target row to determine if one or more bits of the second target row changed. In another example, the indication that the memory unit is not susceptible to induced charge leakage is generated further based on determining that one or more bits of the second target row did not change.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processor; and
   memory storing instructions that, when executed by the at least one processor, causes the system to perform a set of operations, the set of operations comprising:
   accessing, for a memory unit, a physical adjacency map;
   determining, based on the physical adjacency map, a first set of adjacent memory rows for a first target row of the memory unit;
   activating, using a susceptibility test sequence, each memory row of the first set of adjacent memory rows, wherein the susceptibility test sequence does not comprise at least one of a load instruction or a store instruction;
   evaluating the first target row to determine if one or more bits of the first target row changed; and
   based on determining that one or more bits of the first target row did not change, generating an indication that the memory unit is not susceptible to induced charge leakage.

2. The system of claim 1, wherein the susceptibility test sequence comprises a cache line flush instruction for each memory row of the first set of adjacent memory rows.

3. The system of claim 2, wherein the cache line flush instruction for each memory row causes the processor to prefetch data from the memory unit, thereby generating an activation for the memory row.

4. The system of claim 1, wherein the set of operations further comprises loading a predetermined sequence of bits into the first target row, and wherein evaluating the first target row to determine if one or more bits of the first target row changed comprises evaluating the first target row based on the predetermined sequence of bits.

5. The system of claim 1, wherein the set of operations further comprises:
   determining, based on the physical adjacency map, a second set of adjacent memory rows for a second target row of the memory unit, wherein the second target row of the memory unit is in a different bank of the memory unit than the first target row;
   activating, using the susceptibility test sequence, each memory row of the second set of adjacent memory rows; and
   evaluating the second target row to determine if one or more bits of the second target row changed.

6. The system of claim 5, wherein the indication that the memory unit is not susceptible to induced charge leakage is generated further based on determining that one or more bits of the second target row did not change.

7. A method for generating a physical adjacency map, comprising:
   initializing content of a memory unit;
   activating, using a susceptibility test sequence, a first memory row of the memory unit;
   evaluating the memory unit based on the content to identify one or more rows of the memory unit where bits changed; and
   generating, based on an evaluation of the one or more rows and the first memory row, a physical adjacency map indicating at least one row of the one or more rows is adjacent to the first memory row.

8. The method of claim 7, further comprising:
   determining, based on the physical adjacency map, a set of adjacent memory rows for a target row of the memory unit;
   activating, using the susceptibility test sequence, each memory row of the set of adjacent memory rows;
   evaluating the target row to determine if one or more bits of the target row changed; and
   based on determining that one or more bits of the target row did not change, generating an indication that the memory unit is not susceptible to induced charge leakage.

9. The method of claim 7, wherein the susceptibility test sequence is a sequence selected from a group of sequences consisting of:
   an optimized cache line flush instruction for the first memory row that causes the first memory row to be prefeteched, thereby generating an activation for the first memory row;
   a load instruction for the first memory row and a cache line flush instruction for the first memory row; and
   a store instruction for the first memory row and a cache line flush instruction for the first memory row.

10. The method of claim 7, wherein initializing content of the memory unit comprises one of:
    loading a sequence of predetermined bits into at least part of the memory unit; or
    storing at least a part of the memory unit content.

11. The method of claim 7, wherein initializing content of the memory unit comprises:
    generating an indication to an interposer to suppress refresh commands to the memory unit.

12. The method of claim 11, further comprising: after activating the first memory row, generating an indication to the interposer to permit refresh commands to the memory unit.

13. A method for identifying susceptibility of induced charge leakage for a memory unit, comprising:
    accessing, for a memory unit, a physical adjacency map;
    determining, based on the physical adjacency map, a first set of adjacent memory rows for a first target row of the memory unit;
    activating, using a susceptibility test sequence, each memory row of the first set of adjacent memory rows, wherein the susceptibility test sequence does not include a load instruction or a store instruction;
    evaluating the first target row to determine if one or more bits of the first target row changed; and
    based on determining that one or more bits of the first target row did not change, generating an indication that the memory unit is not susceptible to induced charge leakage.

14. The method of claim 13, wherein the susceptibility test sequence comprises a cache line flush instruction for each memory row of the first set of adjacent memory rows.

15. The method of claim 14, wherein the cache line flush instruction is an optimized cache line flush instruction.

16. The method of claim 13, wherein the method further comprises loading a predetermined sequence of bits into the first target row, and wherein evaluating the first target row to determine if one or more bits of the first target row changed comprises evaluating the first target row based on the predetermined sequence of bits.

17. The method of claim 13, further comprising:
determining, based on the physical adjacency map, a second set of adjacent memory rows for a second target row of the memory unit, wherein the second target row of the memory unit is in a different bank of the memory unit than the first target row;
activating, using the susceptibility test sequence, each memory row of the second set of adjacent memory rows; and
evaluating the second target row to determine if one or more bits of the second target row changed.

18. The method of claim 17, wherein the indication that the memory unit is not susceptible to induced charge leakage is generated further based on determining that one or more bits of the second target row did not change.

19. The system of claim 1, wherein the accessed physical adjacency map is identified based on characteristics of the memory unit.

20. The method of claim 13, wherein the accessed physical adjacency map is identified based on characteristics of the memory unit.

* * * * *